Sept. 3, 1963 E. L. GUERRANT 3,102,546
COMBINED CARRIER AND TENT FOR AUTOMOBILE
Filed June 20, 1960 2 Sheets-Sheet 1

EDMONDS L. GUERRANT
INVENTOR.

BY *Herbert J. Brown*

ATTORNEY

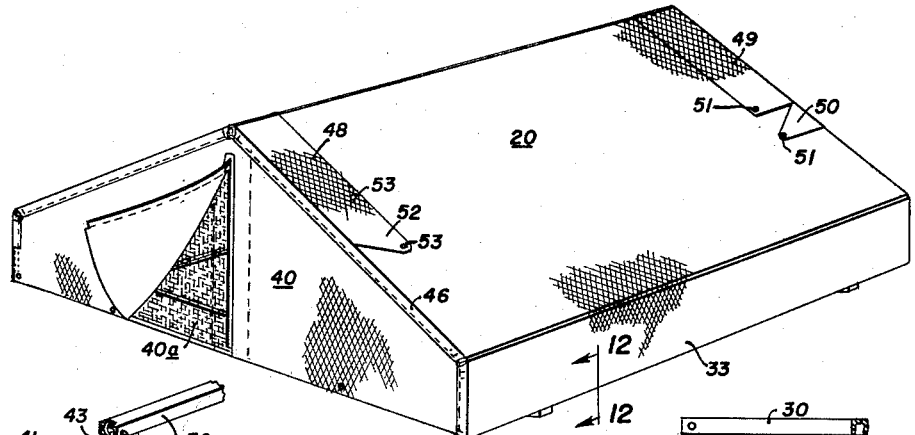
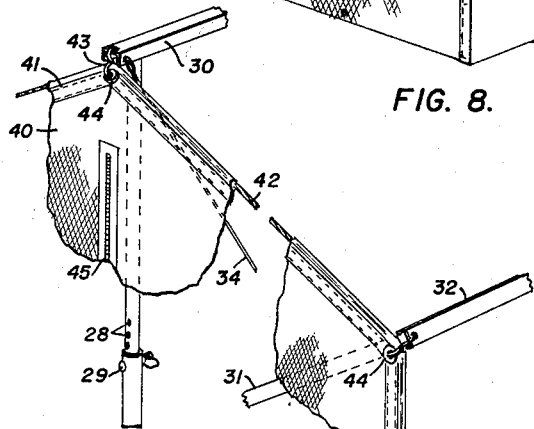
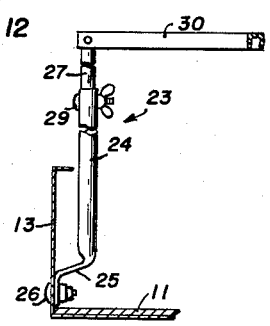
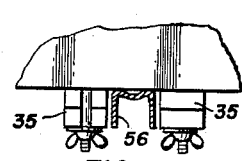
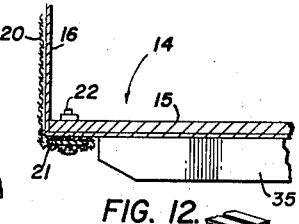
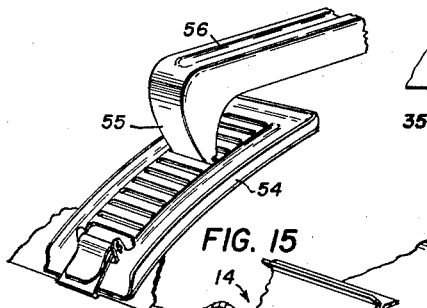
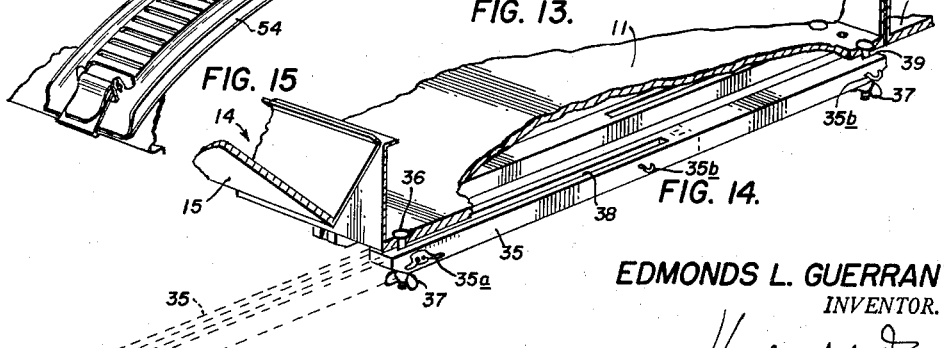
EDMONDS L. GUERRANT
INVENTOR.
BY
ATTORNEY United States Patent Office 3,102,546
Patented Sept. 3, 1963

3,102,546
COMBINED CARRIER AND TENT FOR
AUTOMOBILE
Edmonds L. Guerrant, Fort Worth, Tex., assignor to Camp'otel Corporation, Fort Worth, Tex., a corporation of Texas
Filed June 20, 1960, Ser. No. 37,298
4 Claims. (Cl. 135—1)

This invention relates to camping equipment and has reference to a combined carrier and tent for use on the top of an automobile.

An object of the invention is to provide a carrier-tent capable of sleeping four adults, yet one which may be erected or folded by one person in a matter of minutes.

A further object is to provide a permanently attached canvas which serves both as a tent and a carrier cover and including means accommodating stretching and shrinkage of the canvas when used as a carrier cover.

Another object is to provide means for conveniently carrying various items of camping equipment, and particularly carrying sleeping bags and mattresses in their unfolded positions so that they are ready for use as soon as the tent is erected.

Another object is to provide a combined carrier and tent combination including rope connections for automatically raising the tent poles when the carrier is extended to its opened position.

Additional objects include a simplified construction requiring only two ropes to tie down the cover when used as a carrier and to maintain the tent in an erect position when used as a shelter, a tent having maximum ventilation, yet weatherproof when required and an end panel construction which is easy to attach and dismantle.

These and other objects will become apparent from the following description and the accompanying drawing, wherein:

FIGURE 8 is a perspective view of the construction when erected as a tent.

FIGURE 9 is a broken perspective view illustrating the attachment of end panels to the ridge pole.

FIGURE 10 is a view similar to FIGURE 9 and showing attachment of a corner of an end panel to a hip pole.

FIGURE 11 is a broken longitudinal sectional view showing the hinged mounting of one of the tent poles.

FIGURE 12 is an enlarged sectional view taken on line 12—12 of FIGURE 8.

FIGURE 13 is a broken elevation and sectional view taken at a right angle with reference to FIGURE 12.

FIGURE 14 is a broken perspective view illustrating, partly by means of dotted lines, laterally extensible members for supporting side sleeping compartments which are hingedly attached to the sides of the primary or double sleeping compartment.

FIGURE 15 is an enlarged broken perspective view of a portion of a conventional top carrier for mounting the invention on the top of an automobile.

Figure 1:
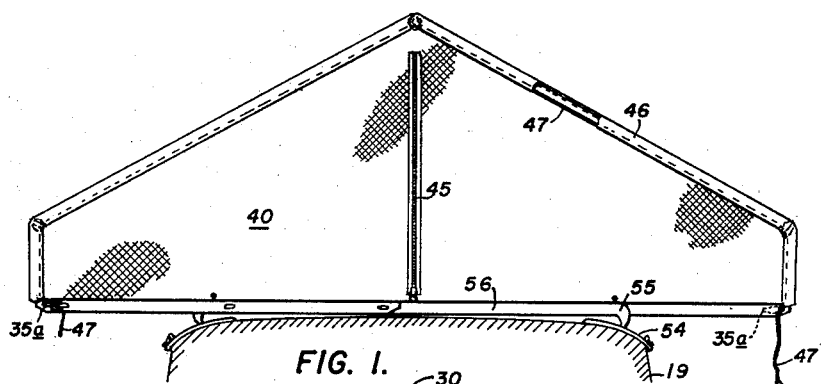
FIGURE 1 is an end elevation, shown partly in broken section, of a combined carrier and tent erected as a shelter on the top of an automobile.

The construction shown includes a primary double sleeping compartment 10 having a floor 11, side walls 12 and ends 13. Similarly, there are single side sleeping compartments 14 on each side of the primary compartment 10, and which single compartments include floors 15, sides 16 and ends 17. Adjoining sides of the single compartments are attached along their upper edges to the upper side edges of the primary compartment 10 by means of hinges 18. It is to be noted that the primary compartment is nearly as wide as the automobile top 19 shown in FIGURE 1.

A feature of the invention is directed to the canvas cover 20 which not only serves as a tent roof but as a carrier cover as well. Side edges of the cover 20 are secured to the lower outer edges of the single compartments 14 in the manner illustrated in detail in FIGURE 12. The edges of the canvas cover 20 are looped about bars 21 extending the length of the single compartments and are secured by bolts 22 extending through the compartment floors 15.

Figure 2:
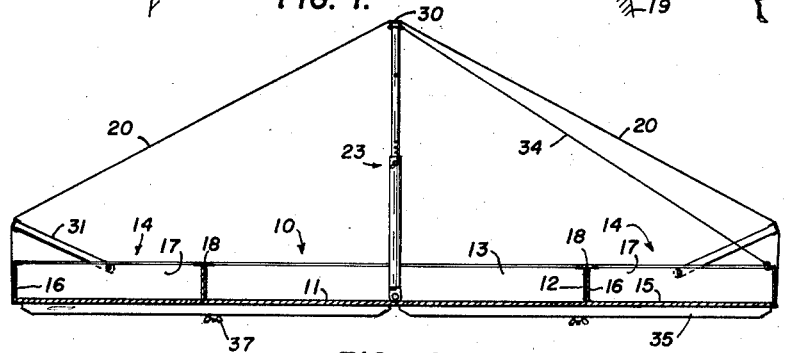
FIGURE 2 is a view similar to FIGURE 1 and illustrating the erected tent in transverse section.
Figure 3:
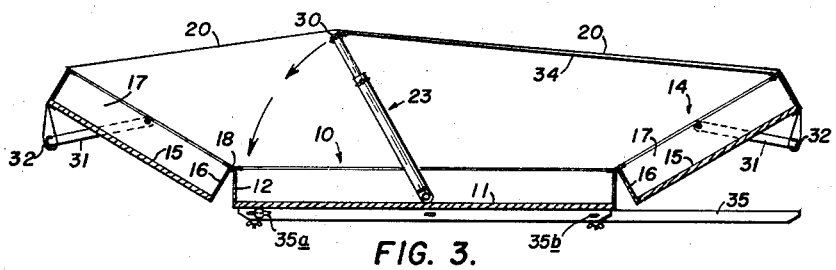
FIGURE 3 is a view similar to FIGURE 2 and showing the conversion from tent to carrier.

Extensible tent poles 23 are pivotally mounted at their terminal ends to the lower center and inner surfaces of the ends 13 of the primary compartment 10, a detail of which construction is illustrated in FIGURE 11. Each tent pole 23 is comprised of a tubular sleeve 24 having an offset 25 at its lower end where it is pivotally mounted to the compartment end 13 by means of a bolt 26. An extensible rod 27 is slidably received in each sleeve 24 and which rod includes a row of holes 28 therethrough for receiving a demountable bolt 29 in the outer end of the sleeve. The outer ends of the rod 27 engage the ends of a ridge pole 30 which supports the center of the canvas cover 20 when used as a tent. Arms 31 are pivotally mounted on the outer surfaces of the outer compartment ends 17 near the centers thereof and the extending ends of the arms have hip poles 32 mounted thereon for engaging the inner surface of the canvas cover 20. When the arms 31 and hip poles 32 are in their angularly raised positions, such as shown in FIGURES 2 and 10, they provide side walls 33 in the canvas cover 20. Erecting ropes 34 are connected between outer corners of one of the single side compartments 14 and with the ends of the ridge pole 30 and whereby the tent poles 23 are automatically and at least partially raised when converting from carrier position to tent position.

When the side compartments 14 are in their extended positions they are supported by laterally extensible members 35 which are slidably secured to the bottom of the floor 11 of the primary compartment 10 and the construction of which is shown in detail in FIGURE 14. The laterally extensible members 35 are adjustably secured by means of bolts 36 extending through the floor 11 and have wing nuts 37 on their outer ends. The bolts 36 are located near the compartment sides 12 and the extending end of each member 35 is slotted, as at 38, to accommodate the shank of the bolt passing therethrough whereas the remaining end of the member is notched, as at 39, to engage a bolt and a wing nut when the member is in its retracted position.

Referring now particularly to FIGURES 9 and 10, end panels 40 are provided to close the ends of the erected tent, and each panel is hemmed to provide a casing 41 which receives a rope 42 therethrough. The extending ends of the rope 42 are secured to the lower outside corners of the panels 40, by any suitable means such as by tying knots therein. Hooks 43 are secured in grommets 44 in the panels 40, and which hooks are positioned to engage corresponding holes, not numbered, in the ends of the ridge pole 30 and hip poles 32. Similarly, hooks 43 in grommets 44 are provided at the lower corners of the panels 40 for engaging holes in the outer lower corners of the side compartments 14. A zipper 45 is provided in each panel 40 and extends vertically from the center and base thereof toward the panel apex. A mosquito net 40a, shown only in FIGURE 8, may be secured to the upper and side edges of each end panel 40 by any suitable means such as sewing.

The ends of the canvas cover 20 extend short distances beyond the ends of the ridge pole 30 and hip poles 32, and are hemmed to provide casings 46 which receive tie-down ropes 47, the extending ends of which are pulled tight and tied to cleats 35a on outer sides of the extensible supporting members 35, when the tent is erected.

Figures 5, 6:
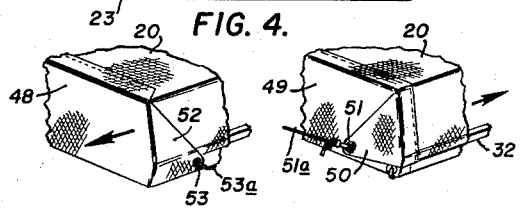
FIGURES 5 and 6 are broken perspective views of rear and forward corners of the closed carrier and illustrating the preferred means for battening the corner flaps.

Referring now to FIGURES 5, 6 and 8, the ends of the canvas cover 20 are provided with forward and rear end flaps 48 and 49. As shown in FIGURE 8, the end flaps 48 and 49 extend across the longitudinal center of the canvas cover 20 and are of such lengths that the ends thereof project beyond the corners of the closed assembly when used as a carrier. The rear end flap 49 is notched at its outer ends to provide box corner pieces 50 which have grommets 51 for mitering the corners as shown in FIGURE 6. The forward end flap 48 has triangular extensions 52 and grommets 53 therein and spaced therefrom in the flap for mitering corners as shown in FIGURE 5. Ropes 51a and 53a are laced through grommets 51 and 53, respectively, and around hooks 35b on supporting members 35 when securing the end flaps in place. The described arrangement of triangular extensions 52 and box corner pieces 50 lend to weather proofing the carrier when the automobile on which it is mounted is moving in a forward direction.

Figure 4:
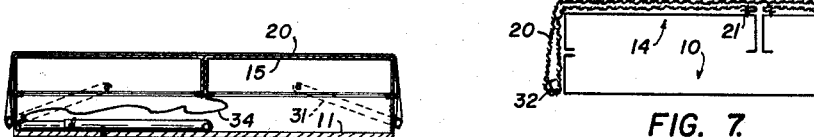
FIGURE 4 is a transverse section showing the invention in its closed position.
Figure 7:
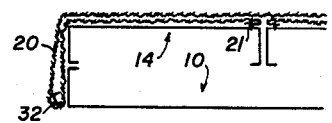
FIGURE 7 is a schematic view of a broken transverse section of the carrier illustrating the position of the tent roof employed as a carrier cover.

The described construction is designed to be mounted on the top of an automobile by means of any suitable conventional carrier supporting means such as shown in FIGURE 15. The illustrated support is comprised of four notched contour plates 54 secured to the gutters, not shown, of the automobile, the notches of which plates engage depending wedges 55 of cross members 56. It is to be noted that a cross member 56 is illustrated in FIGURE 13, but removed from FIGURE 14 in order to better illustrate the latter. The erecting of the tent, weather proofing the same relative to the end panels 40, closing the side compartments and applying the cover end flaps 48 and 49 have been described in the foregoing; however, it is pointed out that when the construction is in its carrier position as illustrated in FIGURES 4 and 7, the hinged hip poles 32 serve to hold the canvas cover taut, by reason of the canvas cover 20 being looped therearound, and by the laced ropes in grommets 51 and 53.

The invention is not limited to the construction herein shown and described, but may be made in various ways within the scope of the appended claims.

What is claimed is:

1. A combined carrier and tent comprising: a primary rectangular compartment, side compartments hingedly mounted on opposite sides of said primary compartment and adapted to close thereover, a canvas cover secured to the extending side of said side compartments and positioned over said primary compartment, displaceable tent poles extending upwardly from the ends of said primary compartment, a ridge pole mounted on the extending ends of said tent poles, an arm pivotally mounted on each end of each said side compartment, the pivotal location of each said arm being inwardly of the extending side of said side compartment and each arm being of sufficient length to extend outwardly thereof when said side compartment is in its carrier position, and a hip pole connecting the extending ends of said arms on each said side compartment and beneath said canvas cover, said cover being looped around said hip poles to hold said cover taut when said side compartments are in their carrier positions.

2. A combined carrier and tent as defined in claim 1 and including end panels to fit the erected tent, and hooks connecting the corners of said end panels with the ends of said ridge pole and said hip poles.

3. A combined carrier and tent as defined in claim 1 and wherein said tent poles are pivotally mounted in the ends of said primary compartment, erecting ropes connected between the ends of said ridge pole and corresponding extending corners of one of said side compartments, said erecting ropes cooperating with said tent poles to raise said ridge pole when said one said side compartment is being opened.

4. A combined carrier and tent as defined in claim 2 and wherein the ends of the canvas cover extend over the edges of the assembled said panels, a casing at each said end of said canvas cover, and tie down ropes slidably received in said casings.

References Cited in the file of this patent

UNITED STATES PATENTS

| | | |
|---|---|---|
| 124,239 | Winslow | Mar. 5, 1872 |
| 794,036 | McCall | July 4, 1905 |
| 1,241,342 | Chapman | Sept. 25, 1917 |
| 1,320,794 | Palmer et al. | Nov. 4, 1919 |
| 1,407,135 | Ebbs | Feb. 21, 1922 |
| 1,499,972 | Canfield | July 1, 1924 |
| 1,560,110 | Skog | Nov. 3, 1925 |